July 7, 1964   R. L. SHILTS ETAL   3,140,216
PRECISION TIRE BUILDING DRUM
Filed April 18, 1962   6 Sheets-Sheet 1

INVENTORS
RICHARD L. SHILTS AND
WILLIAM H. ROTTENBERG, SR
BY
Teare, Fetzer + Teare
ATTORNEYS July 7, 1964 R. L. SHILTS ETAL 3,140,216
PRECISION TIRE BUILDING DRUM
Filed April 18, 1962 6 Sheets-Sheet 2

INVENTORS
RICHARD L. SHILTS AND
WILLIAM H. RUTTENBERG, SR.
BY
Teare, Fetzer + Teare
ATTORNEYS

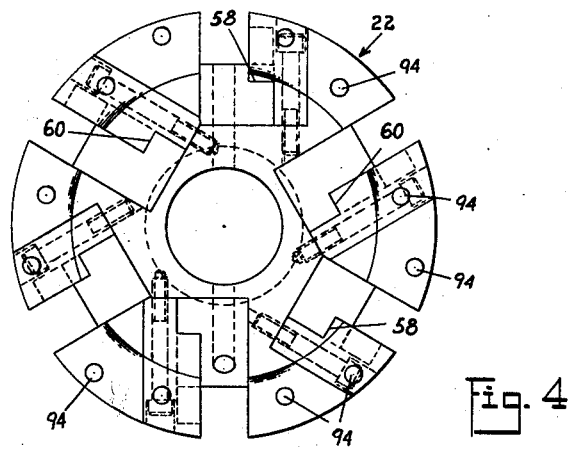
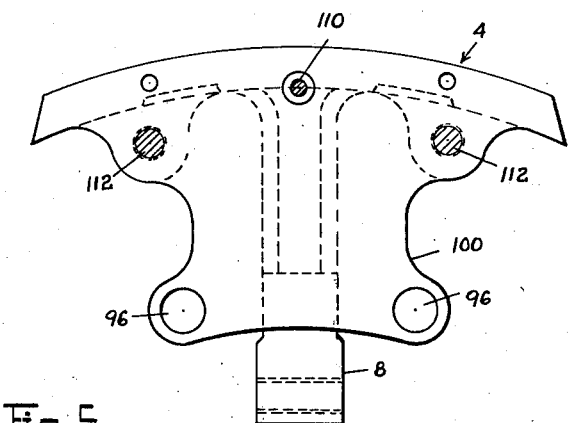

INVENTORS
Richard L. Shilts and
William H. Ruttenberg, Sr.

BY Teare, Tetzer & Teare
ATTORNEYS

INVENTORS
RICHARD L. SHILTS AND
WILLIAM H. RUTTENBERG, SR.
BY
Teare, Fetzer + Teare
ATTORNEYS

United States Patent Office 3,140,216
Patented July 7, 1964

3,140,216
PRECISION TIRE BUILDING DRUM
Richard L. Shilts, Atwater, and William H. Ruttenberg, Sr., Akron, Ohio, assignors to The Akron Standard Mold Company, Akron, Ohio, a corporation of Ohio
Filed Apr. 18, 1962, Ser. No. 188,507
10 Claims. (Cl. 156—417)

This invention relates to an improved tire building drum, and more particularly relates to a precision tire building drum formed of a plurality of segments which may be radially collapsed for removal of carcass plies or the like and which permits axial adjustment of the continuous tire building surface.

In normal practice, tire casings are built by assembling the component parts, such as carcass plies, bead, tread and side wall portions of the tire in the form of a flat band on a continuous surface presented by a tire building drum. In practice, the drum is composed of a plurality of annular drum segments, which are arranged for collapsible movement to reduce the drum diameter for enabling removal of the tire band for subsequent shaping and vulcanizing operations. Heretofore, collapsible drums have been made of a plurality of segments, some of which are movable inwardly to perform the collapsing operation. In such cases, the segments are actuated by complex and expensive hinged or linkage arrangements, which require considerable maintenance in order to keep the drums in proper working condition. Further difficulties have arisen in order to adapt the tire building drum for use in building tire bands of different widths without disturbing the continuity of the tire building surface. In such cases, axial adjustment of the tire building surface to accommodate building of bands of varying widths must be accomplished by means of a device which is accurately aligned with the tire building surface and in a manner to maintain a high degree of precision in the expanded condition of the drum. Additionally, such a device must be susceptible to rapid and easy interchangeability with relation to the drum segments without disturbing or distorting the continuity of the tire building surface.

Accordingly, it is a principal object of this invention to provide a collapsible tire building drum, which may be quickly and precisely collapsed in a manner to allow removal of the band therefrom without damage or distortion.

A further object of the present invention is to provide a precise tire building drum which can be quickly and accurately expanded and collapsed while being of a relatively simple and rugged construction.

A further object of this invention is to provide an improved arrangement for axially adjusting tire building drums whereby on a single drum, it is possible to make a large range of tires, of varying widths, without distorting the continuity of the tire building surface.

A still further object of the present invention is to provide an improved arrangement for axially adjusting the width of a tire building surface, which is not only capable of being rapidly assembled and disassembled from the drum, but which is adapted for making such adjustment in a more simplified structure without disturbing the continuity of the tire building surface.

Further objects and advantages, and other new and useful features in the construction, arrangement and general combination of elements for providing a precision tire building drum will be apparent to those skilled in the art, as the following description proceeds with reference to the accompanying drawings, for purposes of illustration, but not of limitation, in which like reference characters designate like parts throughout, wherein:

FIG. 4 is an end view showing another of the cam members removed from the assembly;

FIG. 5 is an end view showing one of the intermediate key segments removed from the assembly;

The foregoing objects are basically accomplished in accordance with this invention by providing a plurality of key segments which are adapted to be mounted for radial and rotational movement with respect to the horizontal axis formed by said segments. Each segment may be engaged for camming coaction with members mounted on a shaft extending through the longitudinal axis formed by said segments, whereby relative movement of said members on said shaft results in a precise predetermined radial movement between said segments and said shaft for effectively collapsing and expanding said segments. Guide means associated with said shaft coact with the segments to guide and steady the segments during such collapsing and expanding movements.

The continuity of the tire building surface may be selectively maintained for desired axial width of the drum by annular segmental spacer means which may be removably secured to the drum segments adjacent the marginal edges thereof.

Figure 1:
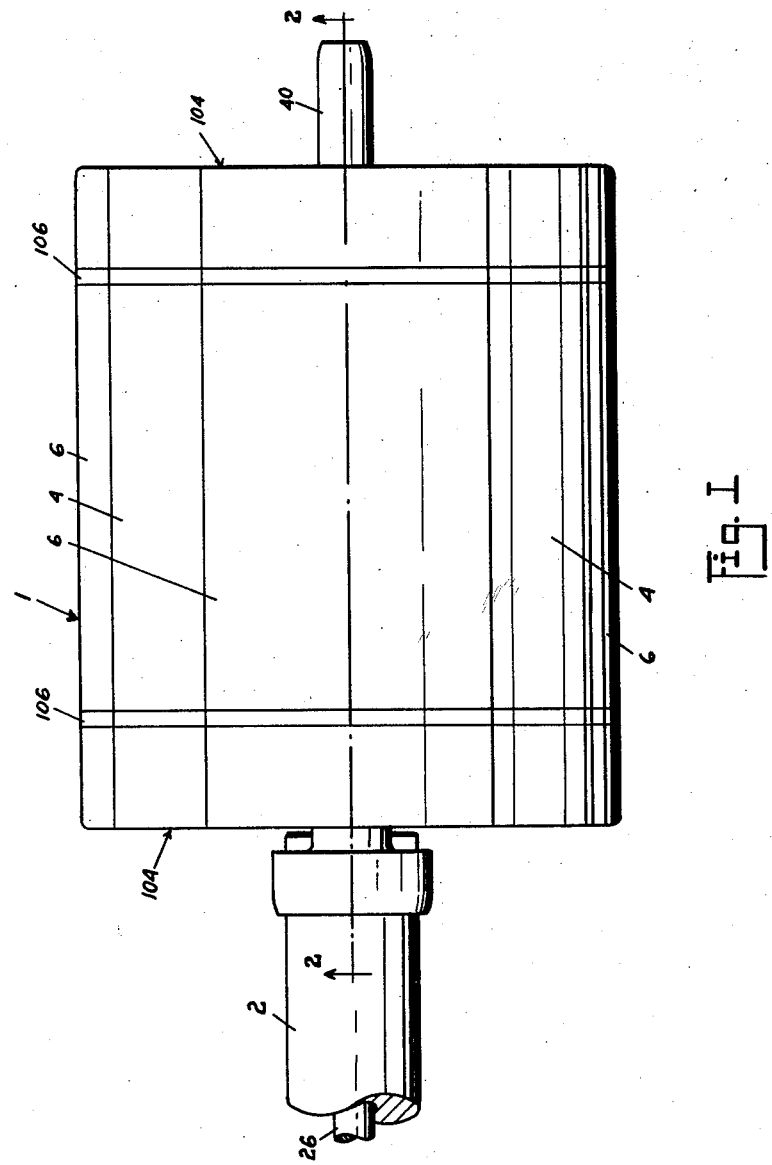
FIG. 1 is a side elevational view, of a precision tire building drum constructed in accordance with the present invention, shown in the expanded condition and mounted on a rotary support.
Figure 2:
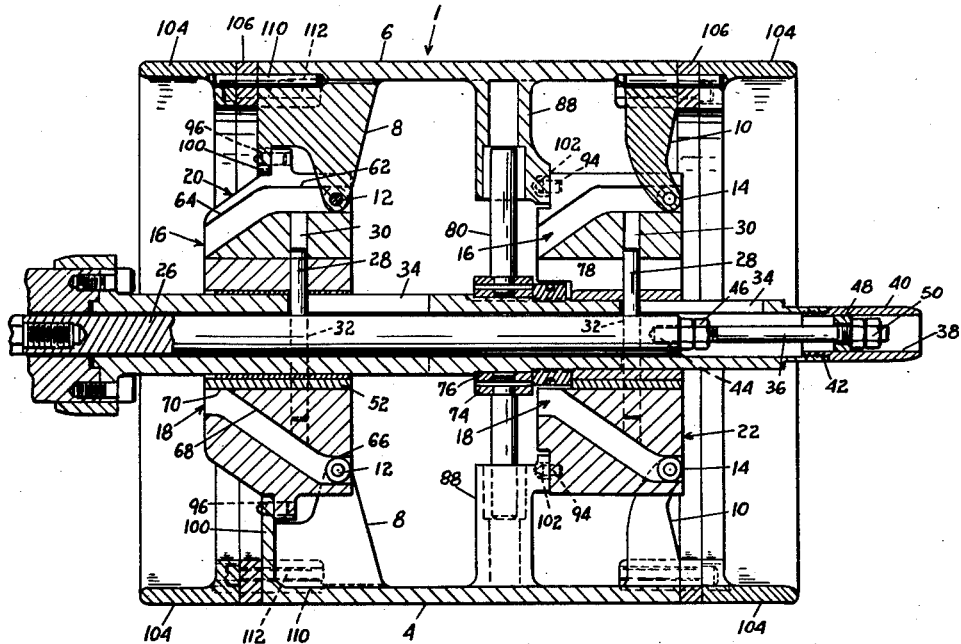
FIG. 2 is a longitudinal section view of the drum embodying the present invention taken along line 2—2 of FIG. 1.

Generally, and with reference to FIGS. 1 and 2, the present invention includes a radially collapsible drum 1 rotatably mounted on a horizontally disposed power-quill 2. Essentially, the drum comprises two sets of arcuate key segments, namely, a set of smaller or intermediate segments 4, and a set of larger segments 6 alternately disposed to form a continuous tire building surface in the expanded condition of the drum. Each of the key segments may be provided with inwardly extended connecting arms 8 and 10, having cam followers or rollers 12 and 14 rotatably journaled adjacent the ends thereof and adapted for slidable coaction within corresponding cam tracks 16 and 18 provided in cam or collapsing members 20 and 22. The cam members 20 and 22 in turn, may be arranged in tandem on the power quill 1 and adapted for axial movement thereon for radially collapsing and expanding the key segments of the drum. Axial movement may be applied to the cam members 20 and 22 by means of a drive shaft 26 reciprocably mounted within the power-quill and secured to the cam members by means of roll pins 28 which are secured at their free ends within vertical bores 30 provided in the cam members, and which are secured within vertical bores 32 provided in the drive shaft. The power-quill 1 may be provided with longitudinally extending slots 34 which are adapted to slidably receive the roll pins, thus allowing axial movement of the cam members 20 and 22 relative to the surface of the quill to cause radial collapsing and expanding of the key segments of the drum upon actuation of the drive shaft 26.

As shown at FIG. 2, the drive shaft 26 may be reciprocably supported at one end by a fluid actuated motor (not shown) and may be supported at its other end by means of a threaded adjusting rod 36. The adjusting rod may extend through a bore 38 formed in a centering plug 40, which in turn may be threadably secured as at 42 to the power-quill. The adjusting rod may be threadably secured at 44 at one end into the drive shaft 26 by means of a lock nut 46 and may be journalled at its other end within a bearing sleeve 48 secured within the bore 38 of the centering plug 40. A locking means 50, in the form of a jam nut, may be threadably secured to the free end of the adjusting rod to facilitate a predetermined axial adjustment of the drive shaft 26 within the power-quill 1.

Figure 3:
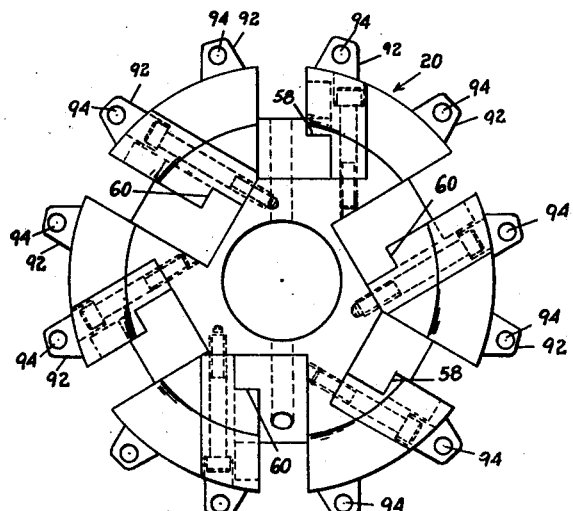
FIG. 3 is an end view showing one of the cam members removed from the assembly.

More specifically, and with reference to FIGS. 2 through 4 of the drawings, the respective cam members 20 and 22 may be provided with annular bushings 52 formed to receive the roll pins 28 and which provide bearing surfaces for relative movement between the cam members and the power-quill 1. Preferably, the cam members are formed having alternately spaced and shaped cam tracks which are disposed on tandem alignment, as viewed in FIG. 2. The number of cam tracks will vary dependent upon the desired number of key segments required to complete the tire building surface. In this form, each cam member may be provided with six alternately spaced cam tracks 16 and 18 disposed in tandem alignment and which may be of a generally L-shaped configuration in cross-section, having shoulder portions 58 and 60, as shown at FIGS. 3 and 4. As shown at FIG. 2, the cam tracks 16 may extend generally planar 62, relative to the longitudinal axis of the drum, and then downwardly 64 toward the axis, whereas the cam tracks 18 may extend planar 66 relative to the axis of a short distance, extend upwardly 68 toward the axis and thence generally planar 70 again relative to the axis of the drum. Such configuration of the cam tracks provides precision radial collapsing and expanding of the drum and causes certain of the key segments comprising the drum to commence collapsing prior to said collapsing of other key segments, as will be hereinafter more fully described.

Figure 8:
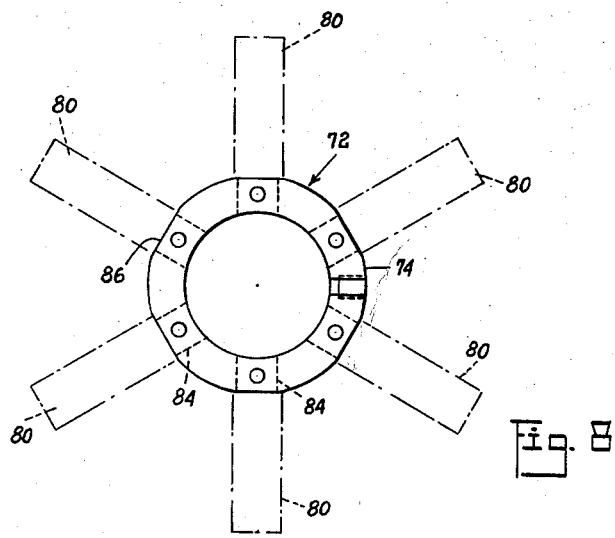
FIG. 8 is an end view showing the hub and guide stud arrangement removed from the assembly.

To further guide and steady the key segments 4 and 6, in their radially collapsing and expanding movements, there may be associated with each segment a telescoping guide assembly, shown generally at 72, of FIG. 8. The assembly may include a sleeve or hub 74 secured against a shoulder 76 formed in the power-quill 1, and locked thereon by means of a threaded nut 78. Preferably, the hub may take the form of a regular polygon, with the number of faces corresponding to the number of key segments required to complete tire building surface. The hub may be provided with radially extending guide studs 80, secured within bores 84 formed in the faces 86 of the hub. Towards their radially outer ends, the guide studs 80 may be adapted to be slidably received within corresponding guide sleeves 88 that extend, respectively, from the key segments 4 and 6. Such telescoping stud and sleeve arrangement guides and steadies the key segments during the radial collapsing and expanding movements of the drum.

To maintain the key segments in the expanded condition of the drum, the cam member 20 may be provided with a plurality of lugs 92 and lug pins 94, such as shown at FIG. 3. In the expanded condition of the drum, shown in FIG. 2, the lug pins 94 are adapted to be slidably received in corresponding bores 96 formed in flange portions 100 of the connecting arms 8. Similarly, the lug pins 94 of the cam members 22 are adapted to be slidably received within corresponding bores 102 formed in the guide sleeves 88 which extend from the key segments. Moreover, axial movement of the cam members to the left, as viewed in FIG. 2, brings the drum to the fully expanded condition, whereby sliding registration of the lug pins within the corresponding bores results in locking the key segments as a rigid unit during the tire building operation.

Figure 6:
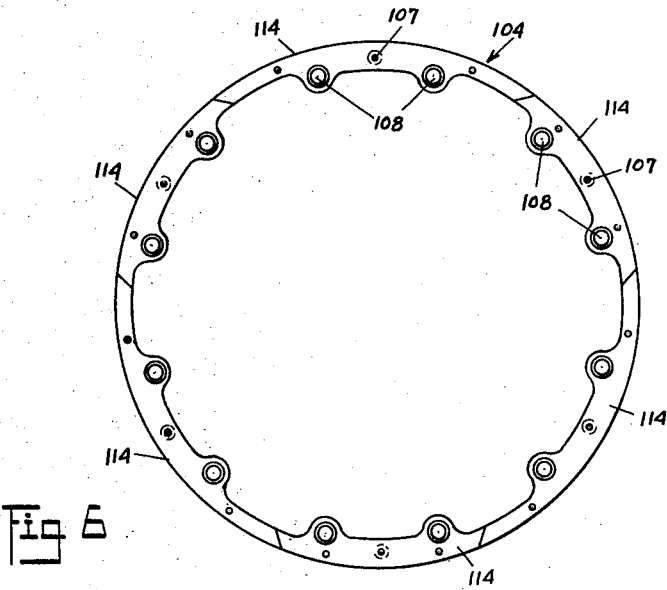
FIG. 6 is an end view showing an annular segmental end ring removed from the assembly.
Figure 7:
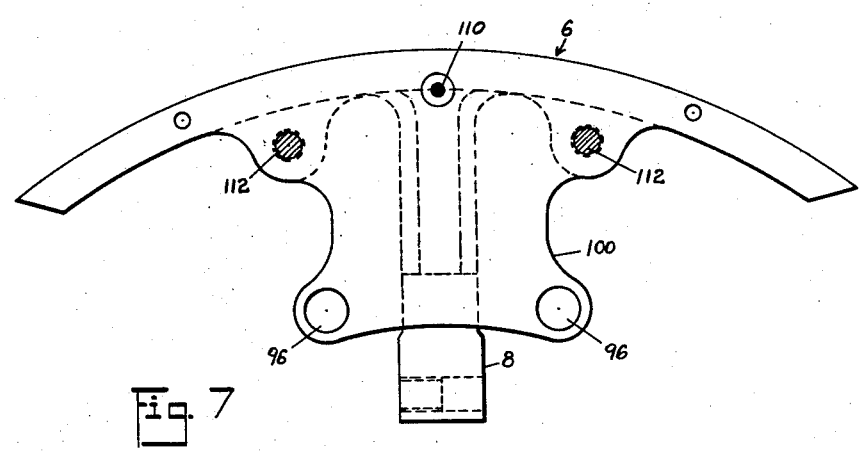
FIG. 7 is an end view showing one of the larger key segments removed from the assembly.
Figure 9:
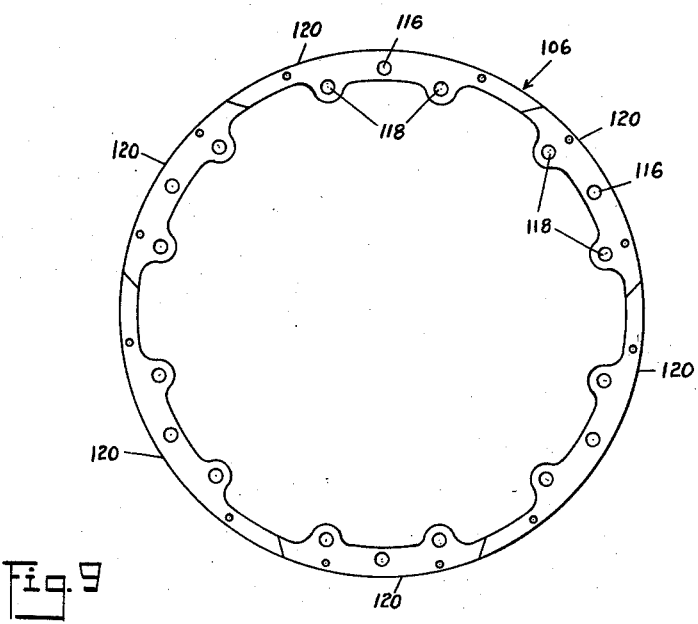
FIG. 9 is an end view of an annular segmental spacer ring removed from the assembly.

To complete the tire building surface and to vary the width of the surface during the tire building operation, the drum may be provided with a pair of annular segmental end rings 104 and one or more annular segmental spacer rings 106, best shown at FIGS. 2, 6 and 9. The segmental end rings 104 may be provided with bores 107 and 108 and removably secured to the drum by means of lug pins 110 and 112 which extend from the respective key segments 4 and 6. As shown, the annular end rings 104 may be formed in six segments 114, corresponding to the number of key segments required to complete the tire building surface. Such an arrangement allows the segmental end rings to be secured to the key segments without interfering with the collapsing or expanding movements of the drum. Similarly, the annular spacer 106 may be provided with bores 116 and 118 and removably interposed between the key segments and the segmental end rings 106 by means of the lug pins 110 and 112. In a like manner, the annular spacer rings 106 may be formed in six segments 120 corresponding to the number of key segments required to complete a tire building surface. Moreover, by a predetermined selection of the number and width of the segmental spacer rings 106, the adjustment in width of the tire building drum is accomplished without disturbing the continuity of the tire building surface. Additionally, the segmental spacer rings are accurately aligned with respect to the key segments and are positively secured thereon in a manner that will securely retain them on the drum during the rotation thereof.

In operation, the key segments can be collapsed and expanded, simply by actuation of the drive shaft 26. Actuation of the drive shaft may be accomplished from a suitable drive power (not shown) to transmit longitudinal or axial movement to roll pins 28. Such movement of the roll pins 28, within the slots 34 formed in the power-quill 1, causes the cam members 20 and 22 to move axially with respect to the outer surface of the power-quill. Such axial movement of cam members results in a camming coaction between the cam followers 12 and 14 and the corresponding cam tracks 16 and 18 resulting in a radial collapsing and expanding of the key segments. The key segments are guided in their collapsing and expanding movements by means of the guide studs 80 of the telescoping hub arrangement 72.

Figure 10:
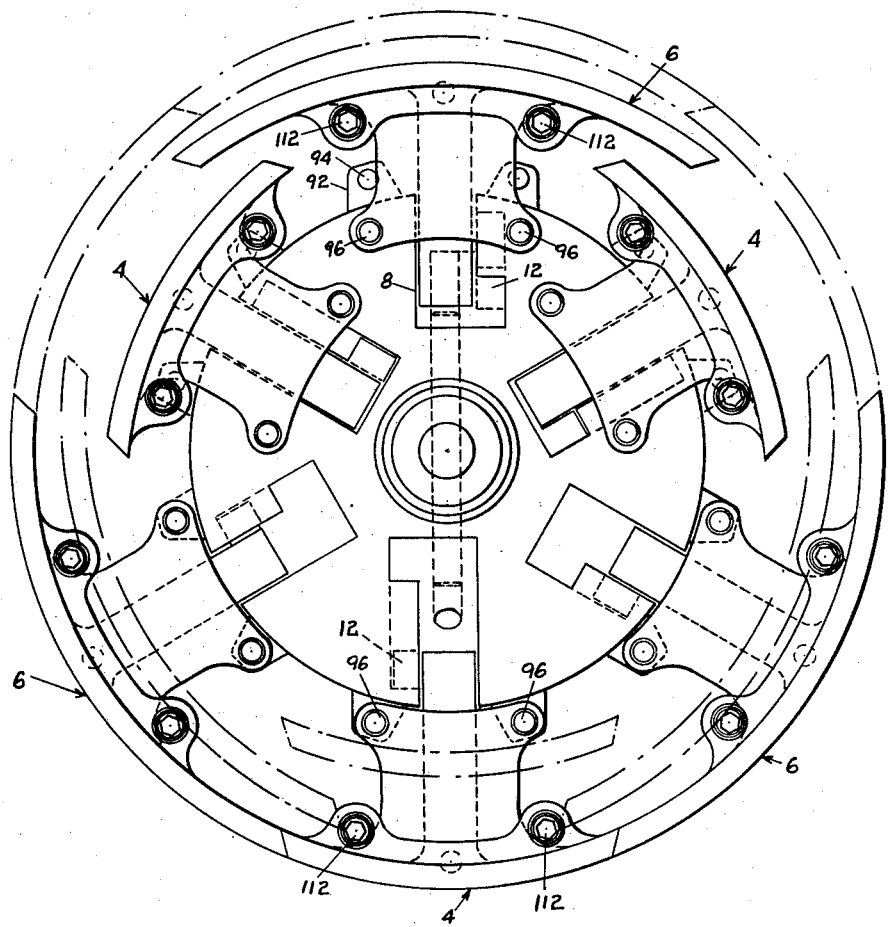
FIG. 10 is an end view showing the segments in collapsed position, by full lines, and in expanded position by broken lines.

The camming coaction of the intermediate key segments 4 differs from the camming coaction of the larger key segments 6 in such a manner that the key segments 4 move radially inwardly at a faster rate than the larger key segments, that is, the key segments 4 are caused to move inwardly out of the path of the larger key segments, which may thereafter be drawn by such camming coaction over the key segments 4 into the collapsed condition, as shown by the broken lines at FIG. 10. Thus, it will be seen that the relative disparity between the configurations of the cam tracks 16 and 18 may be utilized to effect a camming coaction to provide clearance between the segments during the collapsing or expanding operations of the drum. The initial movement of the segments 4 inwardly results in a breaking of the adhesion between the segments and the band in a manner to minimize the need for a sudden heavy collapsing force in order to remove the band from the drum. Accordingly, the drum may be collapsed smoothly with greater precision and with a minimum of effort and damage to the band.

The invention provides a simple, rugged, precise collapsing mechanism without the danger of deforming or distorting the carcass plies mounted on the drum. Additionally, with this improvement, the building surface of the drum may be adjusted axially without distorting or disturbing the continuous tire building surface. The adjustment and variation of the width of the tire building surface is simple and economical because of the interlocking relation between the key segments and the spacer rings. Such an assembly may be rapidly assembled and disassembled with a minimum of effort while maintaining a high degree of precision during the expanding and collapsing of the tire building mechanism.

We have shown and described what we considered to be the preferred embodiment of our invention, together with suggested modified forms, and it will be obvious to those skilled in the art that other changes may be made without departing from the scope of our invention as defined by the appended claims.

We claim:

1. A tire building drum comprising, a rotatable shaft, a plurality of drum segments spaced from said shaft, cam follower means depending from each of said segments, cam means attached to and adapted for axial movement relative to said shaft, said cam means having a first and second set of alternately spaced cam tracks, the cam tracks of said first set having portions of different dimensional length relative to corresponding portions on the cam tracks of said second set for moving certain of said segments radially in advance of others of said segments upon collapsing the drum, and for moving said other of said segments radially in advance of said first mentioned segments upon expanding of the drum.

2. A tire building drum in accordance with claim 1, including a telescoping guide assembly attached to said shaft and coacting with each of said segments for maintaining radial movement of said segments relative to said shaft during collapsing and expanding movement of the drum.

3. A tire building drum in accordance with claim 1, including a plurality of axially elongated locking means extending from said cam means for interlocking engagement with said segments upon axial movement of said cam means relative to said shaft for rigidly maintaining the segments in the fully expanded condition of the drum.

4. A tire building drum comprising, a rotatable shaft, a first and second set of alternately disposed key segments spaced from said shaft, cam follower means depending from each of said key segments, at least one cam member attached to and adapted for axial movement relative to said shaft, said cam member having a first and second set of alternately spaced cam track defining grooves adapted to coactingly receive said cam follower means, the grooves in said first set having axially and angularly extending portions of different dimensional length relative to corresponding axially and angularly extending portions in the grooves of said second set, for moving said first set of key segments radially in advance of said second set of key segments, upon collapsing of the drum, and for moving said second set of key segments radially in advance of said first set of key segments upon expanding of the drum.

5. A tire building drum in accordance with claim 4, including a plurality of axially elongated locking means extending from said cam member for interlocking engagement with said key segments upon axial movement of said cam member relative to said shaft, for rigidly maintaining the key segments in the fully expanded condition of the drum.

6. A tire building drum in accordance with claim 5, including a segmental ring member detachably connected to said key segments adjacent the opposite ends of said drum for selectively extending the axial width of the tire building surface.

7. A tire building drum in accordance with claim 6, including at least one segmental spacer ring detachably disposed between said key segment and said segmental ring member adjacent each end of the drum for selectively varying the axial width of the tire building drum while maintaining a smooth, continuous tire building surface.

8. A tire building drum comprising, a hollow, rotatable shaft, a first and second set of alternately disposed key segments spaced from said shaft, an elongated drive member disposed for reciprocable movement within said shaft, a cam follower member depending radially from each of said key segments and having a roller means adjacent one end thereof, a cam member attached to and adapted for axial movement on said shaft upon reciprocation of said drive member, said cam member including a first and second set of alternately spaced cam track defining grooves which coactingly receive therein the roller means depending from said cam follower members, the grooves in said first set having axially extending portions of a shorter dimensional length relative to corresponding axially extending portions on the grooves of said second set for moving said first set of key segments radially in advance of said second set of key segments upon collapsing of the drum, and the grooves in said second set having angularly extending portions of greater dimensional length relative to corresponding angularly extending portions on the grooves of said first set, for moving said second set of key segments radially in advance of said first set of key segments upon expanding of the drum.

9. A tire building drum in accordance with claim 8, including a plurality of spaced, lug members extending radially from said cam member, and an axially elongated lug pin extending from each of said lug members and adapted for interlocking engagement with registered bores on said cam follower members upon axial movement of said cam member relative to said shaft for rigidly maintaining the key segments in the fully expanded condition of the drum.

10. A tire building drum comprising, a hollow, rotatable shaft, a seat of smaller key segments and a set of larger key segments spaced from said shaft, an elongated drive member disposed for reciprocable movement within said shaft, a pair of cam follower members depending radially from each of said key segments and having rollers mounted adjacent the ends thereof, a pair of spaced, generally cone-shaped cam members attached in tandem alignment to and for axial movement on said shaft upon reciprocation of said drive member, each of said cam members including a first and second set of alternately and circumferentially spaced, generally L-shaped cam track defining grooves, each of said grooves having an axially extending planar portion and an angularly extending planar portion adapted to coactingly receive therein, for movement therethrough, the rollers depending from said cam follower members, the axially extending planar portions of the grooves of said first set being of a shorter dimensional length relative to the corresponding axially extending planar portions of the grooves of said second set, for moving said smaller key segments radially in advance of said larger key segments upon collapsing of the drum, and the angularly extending planar portions of said second set of grooves being of a greater dimensional length relative to the corresponding angularly extending planar portions of said first set for moving said larger key segments radially in advance of said smaller key segments upon expanding of the drum.

References Cited in the file of this patent

UNITED STATES PATENTS

| | | |
|---|---|---|
| Re. 22,369 | Bostwick | Aug. 31, 1943 |
| 1,946,449 | Williams | Feb. 6, 1934 |
| 2,367,831 | Manson | Jan. 23, 1945 |
| 2,565,071 | Frazier | Aug. 21, 1951 |
| 2,655,977 | Hodgkins | Oct. 20, 1953 |
| 2,996,108 | Beebee | Aug. 15, 1961 |
| 3,002,875 | Trevaskis | Oct. 3, 1961 |